United States Patent [19]

Kühnel et al.

[11] Patent Number: 4,614,753

[45] Date of Patent: Sep. 30, 1986

[54] LIGHT-RESISTANT AND WEATHER-PROOF POLYOLEFIN FOAMS

[75] Inventors: Werner Kühnel, Neunkirchen-Schöneshof; Paul Spielau, Troisdorf-Eschmar, both of Fed. Rep. of Germany

[73] Assignee: Dynamit Nobel AG, Cologne, Fed. Rep. of Germany

[21] Appl. No.: 830,055

[22] Filed: Feb. 14, 1986

Related U.S. Application Data

[62] Division of Ser. No. 675,359, Nov. 28, 1984, Pat. No. 4,590,221.

[30] Foreign Application Priority Data

Dec. 2, 1983 [DE] Fed. Rep. of Germany ....... 3343676

[51] Int. Cl.⁴ .............................................. C08J 9/06
[52] U.S. Cl. ...................................... 521/85; 521/87; 521/88; 521/90; 521/94; 521/96; 521/143; 521/915
[58] Field of Search ................ 521/85, 90, 87, 94, 521/143, 96, 88, 915

[56] References Cited

U.S. PATENT DOCUMENTS

| | | |
|---|---|---|
| 3,017,371 | 1/1962 | Hohenberg et al. ................. 521/143 |
| 3,470,119 | 9/1969 | Benning et al. ..................... 521/143 |
| 3,645,931 | 2/1972 | Normanton .......................... 521/143 |
| 3,651,183 | 3/1972 | Hosoda et al. ....................... 521/143 |
| 3,655,542 | 4/1972 | Tamai et al. ......................... 521/143 |
| 3,968,463 | 7/1976 | Boysen ................................ 521/143 |
| 4,203,815 | 5/1980 | Noda et al. .......................... 521/143 |
| 4,387,170 | 6/1983 | Kuhnel ................................ 521/143 |

*Primary Examiner*—Morton Foelak
*Attorney, Agent, or Firm*—Felfe & Lynch

[57] ABSTRACT

A method for producing foam polyolefin products which are light-stable and weather-resistant are obtained by the combined use of the following stabilizers:
(a) phenolic antioxidants,
(b) substituted benzophenones and/or substituted benzotriazoles, and
(c) sterically hindered amines.

12 Claims, No Drawings

LIGHT-RESISTANT AND WEATHER-PROOF POLYOLEFIN FOAMS

This is a divisional of application Ser. No. 675,359, filed Nov. 28, 1984, issued on Nov. 14, 1985, now U.S. Pat. No. 4,590,221.

BACKGROUND OF THE INVENTION

The invention relates to a method for the preparation of polyolefin foams which are resistant to weathering, especially to ultraviolet radiation in daylight, by peroxide crosslinking and foaming with a chemical blowing agent.

It is known to add organic peroxides and blowing agents to polyolefins. The mixing of the polyolefins with the crosslinking peroxides and blowing agents, plus any common additives, can be performed in a roller mixer or extruder, and they can then be fabricated below the degradation temperature of the peroxide into products such as plates or continuous webs. The crosslinking of the polyolefin is then performed by decomposing the crosslinking agent below the decomposition temperature of the blowing agent. Then, or simultaneously, the temperature is raised to the decomposition range of the blowing agent, so that the polyolefin will be foamed by the gases thus formed.

In addition to the peroxide and the blowing agent, plus any additional adjuvants, foaming adjuvants in the form of sterically hindered phenols or organic phosphorus compounds can be added, in accordance with German Auslegeschrift No. 28 46 646, to the polyolefins. Also, foaming adjuvants such as magnesium compounds, for example, can be used in accordance with German Federal Pat. No. 28 52 187.

The known crosslinked polyolefin foams, however, have the disadvantage of only slight resistance to daylight, especially ultraviolet light, and only slight resistance to weathering.

In their customary use, in which the effect of light and moisture is unavoidable, great embrittlement occurred which greatly reduces the usefulness of the foams for a number of applications.

The embrittlement is not prevented by the addition of phenolic antioxidants, which are known to be stabilizers against the effects of light and heat.

The problem therefore existed of reducing the embrittlement occurring under the influence of light, heat and moisture. For numerous applications there has existed the difficult problem of greatly reducing the embrittlement occurring in conventional crosslinked polyolefin foams, and of lengthening useful life by several times before embrittlement sets in under the influence of light and weather. This object is achieved in accordance with the claims.

THE INVENTION

The subject matter of the invention, therefore, is a method for preparing light-resistant and weather-proof foams from polyolefins by crosslinking by addition of an organic peroxide or by energy-rich radiation and foaming with a chemical blowing agent by the action of heat under normal pressure conditions, which is characterized in that, in addition to any other adjuvants and acids the components (a) phenolic antioxidants, (b) substituted benzophenones and/or substitutes benzotriazoles and (c) sterically hindered amines to the polyolefin are added.

The process method of the invention can be acted by mixing of the polyolefins, the crosslinking agents, foaming agents, possibly usual additives, possibly foaming auxiliary agents and the characterizing components (a), (b) and (c) in a mixing unit, as mixing rolls or an extruder, below the decomposition temperature of the crosslinking peroxides and the foaming agent to a mold and subsequent shaping of the molded pieces, such as sheets or continuous sheetings. The mixing is effected such that a crosslinking and foaming essentially does not take place under this state. Subsequently the crosslinking of the polyolefin sheet is made by heating at or above the decomposition point of the crosslinking agent and increasing the melting viscosity of the polyolefin. Contemporary or at a further temperature increase at or above the decomposition temperature of the foaming agent the molded piece is foaming. Depending on the quantity of the foaming agent, the type and quantity of a possibly added foaming auxiliary agent, the crosslinking agent and the process conditions, a foam is obtained having a gross density of 15 kg/m$^3$ to 300 kg/m$^3$, preferably between 20 and 220 kg/m$^3$.

According to the invention there is preferred to use a process for the production of continuous foam sheeting according to the process described in DE-AS No. 1 694 130, U.S. Pat. No. 3,098,831, which is inserted herein by reference.

As foaming agents eliminating gases under the heat agents are preferred which decomposition temperature is equal or higher as the decomposition temperature of the used crosslinking peroxide. Suitable foaming agents are for example azodicarbonamide and/or p,p'-oxy-bis-benzene-sulfonyl-hydrazide and/or dinitrosopentamethylene-tetramine.

The preferred blowing agent in conjunction with the foaming adjuvant of the invention is azodicarbonamide with a decomposition point or range beginning at about 190° C. Especially preferred is azodicarbonamide. The amount of blowing agent to be used is governed by the desired raw density of the foam that is to be prepared, and it is generally between 0.5 and 30 wt.-%, preferably 3.0 to 25 wt.-%, with respect to the total mixture that is to be shaped into a product.

If, in a preferred manner, organic peroxides are used as crosslinking agents, 2,5-dimethyl-2,5-di-(tert.-butyl-peroxy)-hexane, tert.-butylhydroperoxide, cumyl-tert.-butylperoxide, di-tert.-butylperoxide or, preferably, dicumylperoxide can be used, depending on the polyolefin composition. The peroxides are used in amounts of 0.3 to 1.5 wt.-% with respect to the polyolefin.

Crosslinking with energy-rich radiation, especially alpha rays, gamma rays, electron beams, or several such kinds of radiation will also result in resilient foams of the above-named kind and density. Electron beams of 1 to 3 Mev, especially, have a sufficient depth of penetration.

Polyethylene or polypropylene or mixtures thereof can be used as the polyolefins, advantageously polyethylene and/or preferably low-pressure polyethylene of densities of 0.94 g/ccm to 0.97 g/ccm and/or high-pressure polyethylene of densities of 0.91 to about 0.94 g/ccm, preferably high-pressure polyethylene. However, the following are also to be considered covered by the term "polyolefins": copolymers, preferably those in whose preparation monomer mixtures having a predominant proportion of ethylene, as well as mixtures thereof with homopolymers. Examples of such copolymers are: ethylene-propylene copolymers, ethylenebutylene copolymers, copolymers of ethylene and vinyl acetate and its derivatives, copolymers of ethylene and acrylic acid esters or their derivatives, copolymers of ethylene and methacrylic acid or their derivatives, or the like. Even mixtures of the above-named polyolefins with rubbers and/or plastics can be made into foam materials in accordance with the invention. This is to be understood to mean, for example, mixtures consisting to 50 weight-percent and more of polyolefins. Rubbers which are miscible with polyolefins are, for example, natural rubber, ethylene-propylene rubber, butyl rubber, polyisobutylene, ABS rubber, polybutadiene, polybutene, and polyisoprene. Plastics miscible with polyolefins are, for example, polystyrene, chlorinated polyethylene, sulfochlorinated polyethylene, or the like.

Common additives which are customarily used with polyolefin-base plastics are, for example, pigments, fillers, flame retardants, antistatic agents, lubricants or the like, which can be added to the mixture that is to be crosslinked and foamed before it is fabricated into a product.

In the preferred application of the foaming adjuvant of the invention in combination with azodicarbonamide, the crosslinking is performed beginning at about 190° C., and the blowing is performed at temperatures from about 190° C. to about 250° C., preferably to about 220° C.

The invention is characterized in adding the adjuvants a, b and c.

(a). Suitable phenolic antioxidants are phenols of 1 to 4 phenolic hydroxyl groups and suitable melting points are between 35° and 180° C. Especially suitable are sterically hindered phenols having 1 to 4 phenolically bound hydroxyl groups, the phenolic units of structure being univalent in each case. Greatly preferred are phenolic antioxidants in which the weight loss amounts to 5% only above 250° C., as measured by thermogravimetric analysis (TGA) at a temperature rise of 8° C. per minute in air.

The following are specifically mentioned:
Pentaerythrityl-tetrakis-[3-(3,5-di-tert.butyl-4-hydroxyphenyl)-propionate],
Octadecyl-3-(3,5-di-tert.butyl-4-hydroxyphenyl)-propionate,
2,2'-methylene-bis-(4-methyl-6-tert.butylphenol),
2,2'-methylene-bis-(4-ethyl-6-tert.butylphenol),
2,6-di-(2'-hydroxy-3-tert.butyl-5'-methylbenzyl)-4-methyl-phenol,
2,2-bis-(4-hydroxyphenyl)-propane.

Sterically hindered phenols containing —S groups as bonding links are also suitable, such as, for example:
2,2'-thiodiethylbis-[3-(3,5-di-tert.butyl-4-hydroxyphenyl)-propionate].

(b). Suitable benzophenones and/or benzotriazoles are, for example, substituted benzophenones whose one or both rings bear one or more hydroxy groups and/or alkoxy groups having 1 to 18 carbon atoms as well as, in some cases, chloro substituents, and substituted benzotriazoles, especially 2-phenylbenzotriazole or 2-phenylchlorbenzotriazole, in which the phenyl substituent may bear, if desired, one or more hydroxyl groups and/or alkyl groups of 1 to 18, preferably 1 to 6 carbon atoms, such as, for example,
2-hydroxy-4n-octoxy-benzophenone,
2,2-dihydroxy-4-methoxy-benzophenone,
2-hydroxy-4-methoxy-benzophenone,
2,2'-4,4'-tetrahydroxy-benzophenone,
2-hydroxy-5-chlorobenzophenone,
2-(2'-hydroxy-5'-methylphenyl)-benzotriazole,
2-(2'-hydroxy-3',5'-di-tert.butylphenyl-benzotriazole,
2-(2'-hydroxy-3'-tert.butyl-5'-methylphenyl)-5-chlorbenzotriazole,
2-(2'-hydroxy-3',5'-di-tert.butylphenyl)-5-chlorbenzotriazole.

(c). The sterically hindered amines are primarily bis-piperidyl esters of aliphatic dicarboxylic acids substituted in the 2nd and 6th positions, especially of saturated dicarboxylic acid with two to ten methylene groups between the carboxyl moieties. Of these, sebacic acid-bis-2,2,6,6-tetramethyl-4-piperidyl ester and its homologues are preferred.

The phenolic antioxidants are added in amounts of 0.05 to 3, preferably 0.1 to 1.0 percent of the weight of the polyolefin mixture.

The benzophenones or benzotriazoles are added in amounts of 0.1 to 0.3, preferably 0.3 to 2.0 percent of the weight of the polyolefin mixture.

The sterically impeded amines are added in amounts of 0.1 to 3.0, preferably 0.3 to 2.0 percent of the weight of the polyolefin mixture.

It has been found that the base stabilization with the phenolic antioxidants is not sufficient, and that instead the embrittlement of the foam is only delayed by a few days under the conditions of the standard test.

The additional use of benzophenones and/or benzotriazoles, which by themselves only slightly delay embrittlement, causes the stability to increase abruptly to several weeks, even upon the addition of amounts only equal to the amount of the phenolic antioxidants. Finally, when sterically hindered amines are additionally used, they produce a great additional increase of the stability to several or often many months under the test conditions, which are considerably more severe than actual outdoor weathering.

On the basis of the test results, an unexpectedly improved action of the added substances a, b and c is discerned. Although the amounts added range only from 0.1 gram to a few grams, the total amount of additives a, b and c is greater than the amount of stabilizers that is commonly used. Surprisingly, however, the foam products suffer no impairment of quality. It is true that often the raw density of the foams is increased, which is undesirable from the standpoint of economy of material. Consequently, to achieve the same raw density as in the normal mixture, a slightly increased amount of blowing agents is used, or, less preferentially, the foaming temperature is slightly raised. Neither causes impairment of quality.

It has been found that an additional increase in the stability of the foams against outdoor weathering can be achieved by the addition of organic phosphorus compounds. Especially suitable are esters of phosphorous acid and esters of hypophosphorous acid, preferably their esters of phenols or polyvalent alcohols to which one or more moieties of fatty acids of 8 to 22 carbon atoms can be bonded, monoaldehyde or dialkyl phenylphosphites having alkyl moieties of 6 to 18 carbon atoms, and trisalkyl phenylphosphites having alkyl moieties of 1 to 6 carbon atoms, such as, for example, di(-stearyl)-pentaerythritol-diphosphite, di(isodecyl)-pentaerythritoldiphosphite, trilaurylphosphite, trisnonylphenylphosphite, triphenylphosphite, mono- and dodecylphenylphosphite, decyldiphenylphosphite, trisnonyl-phenylphosphite, monononylphenyl-phosphite, dinonylphenylphosphite, distearyl phenylphosphite, bis(2,4-di-tert.butylphenyl)-pentaerythritoldiphosphite, tris(2,4-di-tert.butylphenyl)phosphite, tetrakis(2,4-di-tert.butylphenyl)-4,4'-biphenylenediphosphonite.

Generally, trialkyl— or triarylester of the phosphoric acid (triphosphits) and dialkyl— or diarylester of the phosphonous acid (diphosphonits) are usable.

EXAMPLES 1 TO 4 AND COMPARATIVE EXAMPLES A TO C 100 weight-parts of LD polyethylene (density 0.923), 1 wt.-part of dicumyl peroxide, 18.3 wt.-parts of azodicarbonamide and the stabilizers listed below along with the parts by weight which are added, are mixed in the melted state and pressed through a wide-slotted die onto a conveyor belt which carries the material at constant velocity through a tunnel oven in which it is foamed and crosslinked at a temperature of 230° C. for a period of 5 minutes, to form a closed-pore foam strip of the density specified in each case. Resistance to light and weathering is tested in the solarium under the standard conditions specified below.

|  | Comparative Examples | | | Examples | | | |
| --- | --- | --- | --- | --- | --- | --- | --- |
|  | A | B | C | 1 | 2 | 3 | 4 |
| Phenolic antioxidant | (a) | 0.3 | 0.3 | 0.3 | 0.3 | 0.3 | 0.3 |
| Benzophenone | b1 | 1.5 | — | — | — | — | — |
| Benzotriazole | b2 | — | 1.5 | 1.5 | 1.5 | 0.8 | 0.8 |
| Sterically hindered amine | (c) | — | — | 0.6 | 1.5 | 0.8 | 0.8 |
| Phosphorus compound | (d) | — | — | — | — | — | 0.8 |
| Raw density (kg/cu · m) |  | 30 | 38 | 42 | 35 | 45 | 41 | 43 |
| Embrittlement after days in solarium at 100° C. solarium conditions being noted following the last example |  | 7 | 14 | 28 | 126 | 126 | 126 | 175 |

(a) Pentaerythritol-tetrakis [3-(3.5-di-tert.butyl-4-hydroxyphenyl)-propionate]
b1 2-hydroxy-4-n-octoxybenzophenone
b2 2(2-hydroxy-3,5'-di-tert.butylphenyl)-5-chlorbenzotriazole
(c) Sebacic acid-bis-2,2,6,6-tetramethyl-4-piperidylester
(d) Di-(stearyl)-pentaerythritoldiphosphite

EXAMPLES 5 AND 6

In a manner similar to the above examples, 1 weight-part of dicumylperoxide, 4 weight-parts of azodicarbonamide and the following stabilizers are added to 100 weight-parts of the polyethylene:

| Stabilizers | Examples | |
| --- | --- | --- |
|  | Wt.-parts | Wt-parts |
| (a) As in Example 1 | 0.2 | 0.2 |
| (b) As in Example 1 | 0.6 | 0.3 |
| (c) As in Example 1 | 0.6 | 0.9 |
| (d) Mono-/Di-nonylphenyl-phosphite | 0.6 | 0.6 |
| Raw Density (kg/m³) | 130 | 130 |
| Embrittlement after days in the solarium. | 175 | 180 |

Resistance to light and weathering is tested in the "solarium" under standard conditions of lighting and moisture. The evaluation is made in the number of days of stability until embrittlement occurs on the surface of the foam sample.

For this purpose, samples measuring 10×4 cm of a thickness of 1 cm are laid on a wire mesh measuring 55×55 cm, at a spacing of 50 cm apart, and exposed to light from 4 Ultra-Vitalux lamps of 3 Watts (manufactured by Osram). The samples were sprayed daily for 15 seconds with distilled water. The stability under the conditions of outdoor weathering amounts to many times the stability under the standard test conditions.

It will be understood that the specification and examples are illustrative but not limitative of the present invention and that other embodiments within the spirit and scope of the invention will suggest themselves to those skilled in the art.

We claim:

1. An article having improved light and weather resistance based on a polyolefin foam, said foam being formed by crosslinking by addition of an organic peroxide or by means of radiation crosslinking and foaming by a chemical blowing agent by the action of heat under normal pressure conditions, comprising adding, in addition to any other adjuvants and aids,
   (a) phenolic antioxidants,
   (b) substituted benzophenones and/or substituted benzotriazoles and
   (c) sterically hindered amines to the polyolefin.

2. The article of claim 1, wherein the phenolic antioxidants are sterically hindered phenols which contain one to four phenolically bound OH groups, with the provision that the phenolic structure units are univalent.

3. The article of claim 1, wherein the substituted benzophenoles have as substituents one or more OH groups and/or alkoxy groups as well as chlorine if desired, and the benzotriazoles are derived from phenylbenzotriazole or phenylchlorobenzotriazole.

4. The article of claim 1, wherein the sterically hindered amines are bis-piperididyl esters of aliphatic dicarboxylic acids.

5. The article of claim 2, wherein the phenolic antioxidants are added in amounts of 0.05 to 3, preferably 0.1 to 1.0 parts by weight with respect to 100 weight-parts of polyolefin.

6. The article of claim 3, wherein the benzophenones or benzotriazoles are added in amounts of 0.1 to 3.0, preferably 0.3 to 2.0 parts by weight with respect to 100 weight-parts of polyolefin.

7. The article of claim 4, wherein the sterically hindered amides are added in amounts of 0.1 to 3.0, preferably 0.3 to 2.0 weight-parts with respect to 100 weight-parts of polyolefin.

8. The article of claim 1, further comprising the addition of an organic phosphorus compound to the polyolefin.

9. The article of claim 8, wherein the organic phosphorus compound is a diphosphonite or a triphosphite.

10. The article of claim 9, wherein the organic phosphorus compound is 4,4'-bisphenylenediphosphonite.

11. The article of claim 8, wherein the organic phosphorus compound is added in amounts of 0.2 to 2.5, preferably 0.4 to 1.2 weight-parts with respect to 100 weight-parts of polyolefin.

12. The article of claim 1, wherein the blowing agent has a decomposition point or decomposition range beginning at about 190° C.

* * * * *